United States Patent Office.

WILLIAM CHRISTMAN, OF PHILADELPHIA, PENNSYVLANIA.

Letters Patent No. 75,729, dated March 24, 1868.

IMPROVED LINIMENT FOR HORSES AND OTHER ANIMALS.

The Schedule referred to in these Letters Patent and making part of the same.

TO ALL WHOM IT MAY CONCERN:

Be it known that I, WILLIAM CHRISTMAN, of Philadelphia, in the county of Philadelphia, State of Pennsylvania, have invented a new and useful Liniment, which is a certain cure for spavin in horses; and I do hereby declare that the following is a full and exact description of the ingredients used therein.

The said liniment is composed of the following ingredients, viz: (1) one ounce camphor; (8) eight ounces turpentine; (6) six ounces balsam of sulphur, and (1) one ounce hog's lard.

What I claim is, the above combination, in the proportions specified.

WM. CHRISTMAN.

Witnesses:
   GEO. F. KOEDEL,
   ADAM MILLER.